United States Patent
Magro et al.

(10) Patent No.: US 8,914,556 B2
(45) Date of Patent: Dec. 16, 2014

(54) DIRECT I/O ACCESS FOR SYSTEM CO-PROCESSORS

(75) Inventors: William R. Magro, Champaign, IL (US); Robert J. Woodruff, Banks, OR (US); David M. Lee, Portland, OR (US); Arlin R. Davis, Yamhill, OR (US); Mark Sean Hefty, Aloha, OR (US); Jerrie L. Coffman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,601

(22) PCT Filed: Sep. 30, 2011

(86) PCT No.: PCT/US2011/054394
§ 371 (c)(1),
(2), (4) Date: Jun. 24, 2013

(87) PCT Pub. No.: WO2013/048477
PCT Pub. Date: Apr. 4, 2013

(65) Prior Publication Data
US 2013/0275631 A1    Oct. 17, 2013

(51) Int. Cl.
*G06F 13/28* (2006.01)
*G06F 13/14* (2006.01)
*G06F 13/16* (2006.01)

(52) U.S. Cl.
CPC ............... *G06F 13/16* (2013.01); *G06F 13/14* (2013.01)
USPC .................................. 710/28; 710/22; 710/23

(58) Field of Classification Search
USPC ................................................ 710/22, 23, 28
See application file for complete search history.

(56) References Cited

U.S. PATENT DOCUMENTS

| | | | |
|---|---|---|---|
| 7,702,826 B2 | 4/2010 | Oztaskin et al. |
| 2008/0313364 A1 | 12/2008 | Flynn et al. |
| 2010/0332720 A1 | 12/2010 | Chang et al. |
| 2011/0161551 A1 | 6/2011 | Khosravi et al. |

OTHER PUBLICATIONS

PCT, ISR/WO of the International Search Authority for Application No. PCT/US2011/054394, (May 11, 2012), Whole Document.

*Primary Examiner* — Farley Abad
(74) *Attorney, Agent, or Firm* — Blakely, Sokoloff, Taylor & Zafman LLP

(57) ABSTRACT

Embodiments of the invention describe systems, apparatuses and methods that enable sharing Remote Direct Memory Access (RDMA) device hardware between a host and a peripheral device including a CPU and memory complex (alternatively referred to herein as a processor add-in card). Embodiments of the invention utilize interconnect hardware such as Peripheral Component Interconnect express (PCIe) hardware for peer-to-peer data transfers between processor add-in cards and RDMA devices. A host system may include modules or logic to map memory and registers to and/or from the RDMA device, thereby enabling I/O to be performed directly to and from user-mode applications on the processor add-in card, concurrently with host system I/O operations.

21 Claims, 7 Drawing Sheets

200

DIRECT I/O ACCESS FOR SYSTEM CO-PROCESSORS

CLAIM OF PRIORITY

This application is a U.S. National Phase application under 35 U.S.C. §371 of International Application No. PCT/US2011/054394, filed Sep. 30, 2011, entitled "DIRECT I/O ACCESS FOR SYSTEM CO-PROCESSORS," the entire contents of which are incorporated herein by reference.

FIELD

Embodiments of the invention generally pertain to computing devices and more particularly to memory access management for peripheral devices.

BACKGROUND

Computing systems include various devices connected to one another via an interconnectivity fabric such as a network or bus structure. These devices typically contain local memory, and multiple devices are operated in parallel to provide processing speed and flexibility within the computing environment.

Remote Direct Memory Access (RDMA) is a network interface card (NIC) feature that enables a computing device to access information in a memory of another computing device. Specifically, via RDMA technology, the computing device may read information from the memory of another computing device, as well as write information to the memory of another computing device, without involvement of a host operating system (OS).

FIG. 1 illustrates a prior art system including a peripheral device having a CPU and memory complex. System 100 includes system CPU 110, system memory 120, peripheral device controller 130, peripheral device 140 and RDMA device 150. Peripheral device 140 includes processor 141 and memory 142. Peripheral device 140 and RDMA device 150 may be referred to as "peer" devices.

Peripheral device 140 may need to access data that is stored in RDMA device 150, and vice versa. Presently, implementations of many interconnectivity fabric standards such as InfiniBand specifications or RDMA Consortium specifications and the like do not enable a peer device to be able to directly access data stored in another peer device's address space.

Current solutions require peer devices to write requested data to a commonly available memory—in this illustration, system memory 120, which is accessible by any peripheral device connected to the interconnectivity fabric; however, using common system memory for such data transfers is time consuming and increases overhead processing. Furthermore, the use of common system memory slows processing operations of the peripheral devices.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
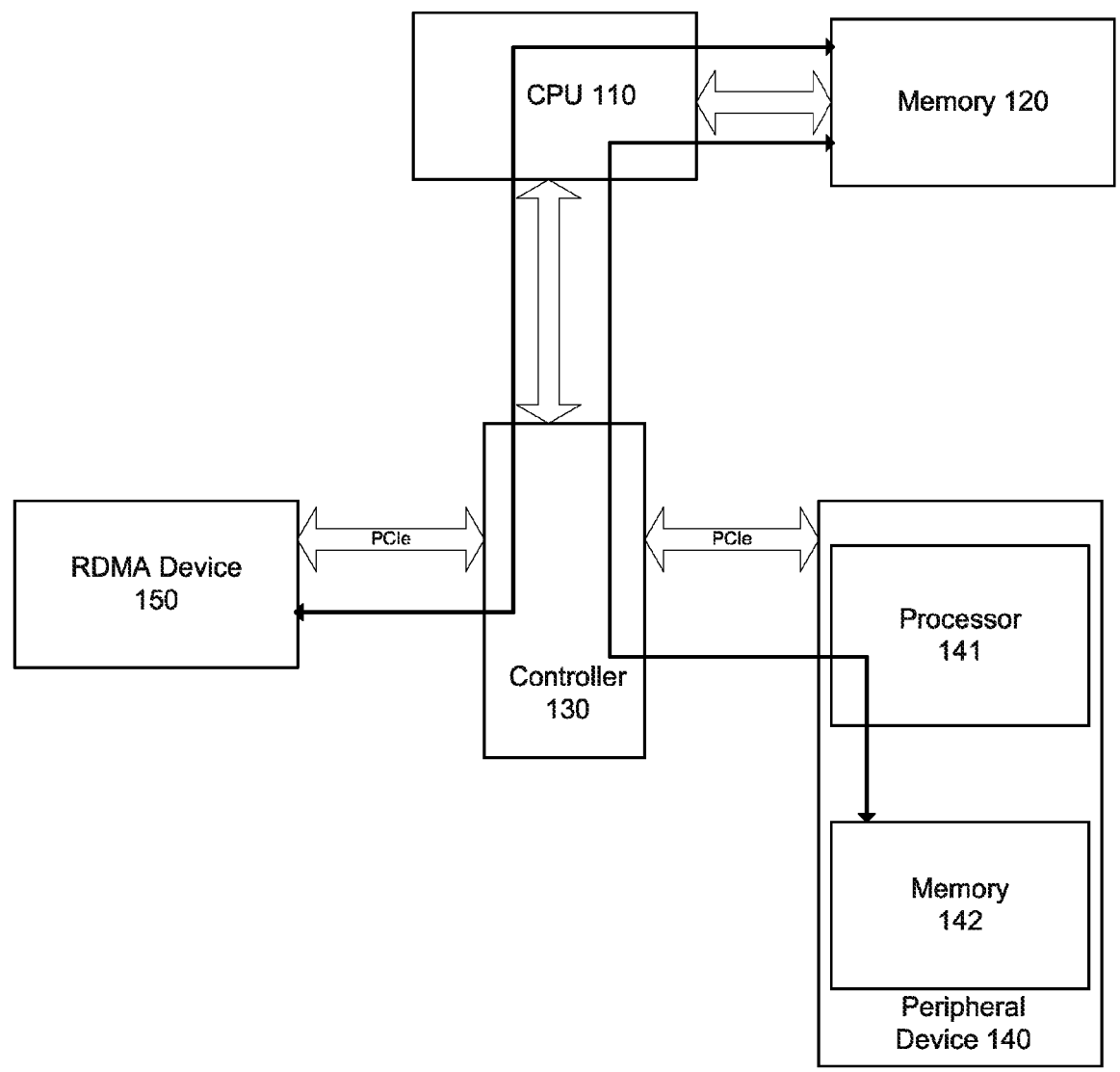
FIG. 1 illustrates a prior art system including a peripheral device having a CPU and memory complex.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention describe systems, apparatuses and methods that enable sharing Remote Direct Memory Access (RDMA) device hardware between a host and a peripheral device including a CPU and memory complex (alternatively referred to herein as a processor add-in card). Embodiments of the invention utilize interconnect hardware such as Peripheral Component Interconnect express (PCIe) hardware for peer-to-peer data transfers between processor add-in cards and RDMA devices. A host system may include modules or logic to map memory and registers to and/or from the RDMA device, thereby enabling I/O to be performed directly to and from user-mode applications on the processor add-in card, concurrently with host system I/O operations.

Examples of processor add-in cards that may utilize embodiments of the invention include graphics processor subsystems having a graphics processor unit (GPU), and processor add-in cards that have a plurality of small, low power processor cores or multi-core processors to improve performance of highly parallel applications. In an accelerated heterogeneous computing environment, however, providing a common, standards-based programming and communication model has proven difficult. This is especially true in clusters, where it is desirable to have efficient communication mechanisms from all processors, whether they are primary system CPUs or co-processor cores in an add-in card. A common, standards-based programming model not only simplifies development and maintenance of applications, but allows greater flexibility for using the system to take full advantage of its performance.

A cluster generally refers to a group of computer systems that have been linked or interconnected to operate closely together, such that in many respects they form a single computer. Clusters generally provide greatly improved performance and/or availability over that provided by a single computer. A cluster is also typically more cost-effective than a single computer of comparable speed or availability.

An important aspect to building large cluster systems is the interconnect. The interconnect may include a "fabric" that connects all of the systems together, as well as host adaptors that interface systems to the fabric. Clusters may utilize interconnects consistent with InfiniBand specifications or RDMA Consortium specifications. InfiniBand is a switched fabric communications link primarily used in high-performance computing and provides quality of service and failover features as well as scalability. An InfiniBand interconnect generally provides lower latency, higher bandwidth, and improved reliability.

RDMA architectures such as InfiniBand have been highly successful in improving performance of High Performance Computing (HPC) cluster applications by reducing latency and increasing the bandwidth of message passing operations. RDMA architectures improve performance by moving the network interface much closer to the application through kernel-bypass, direct data placement, and allow for greater control of I/O operations to match application requirements.

RDMA architecture allows process isolation, protection, and address translation in hardware. This architecture is well-suited for multiple co-processing core environments where host and co-processor applications execute in separate address domains; however, the benefits of RDMA are unavailable to attached processors (i.e., processor add-in cards) in the prior art. Embodiments of the invention bring the benefits of RDMA architecture directly to attached processors, and eliminate the need for solutions as illustrated in FIG. 1, where communications into and out of attached processors must incur additional data copies into host memory, substantially impacting both message latency and achievable bandwidth.

Figure 2:
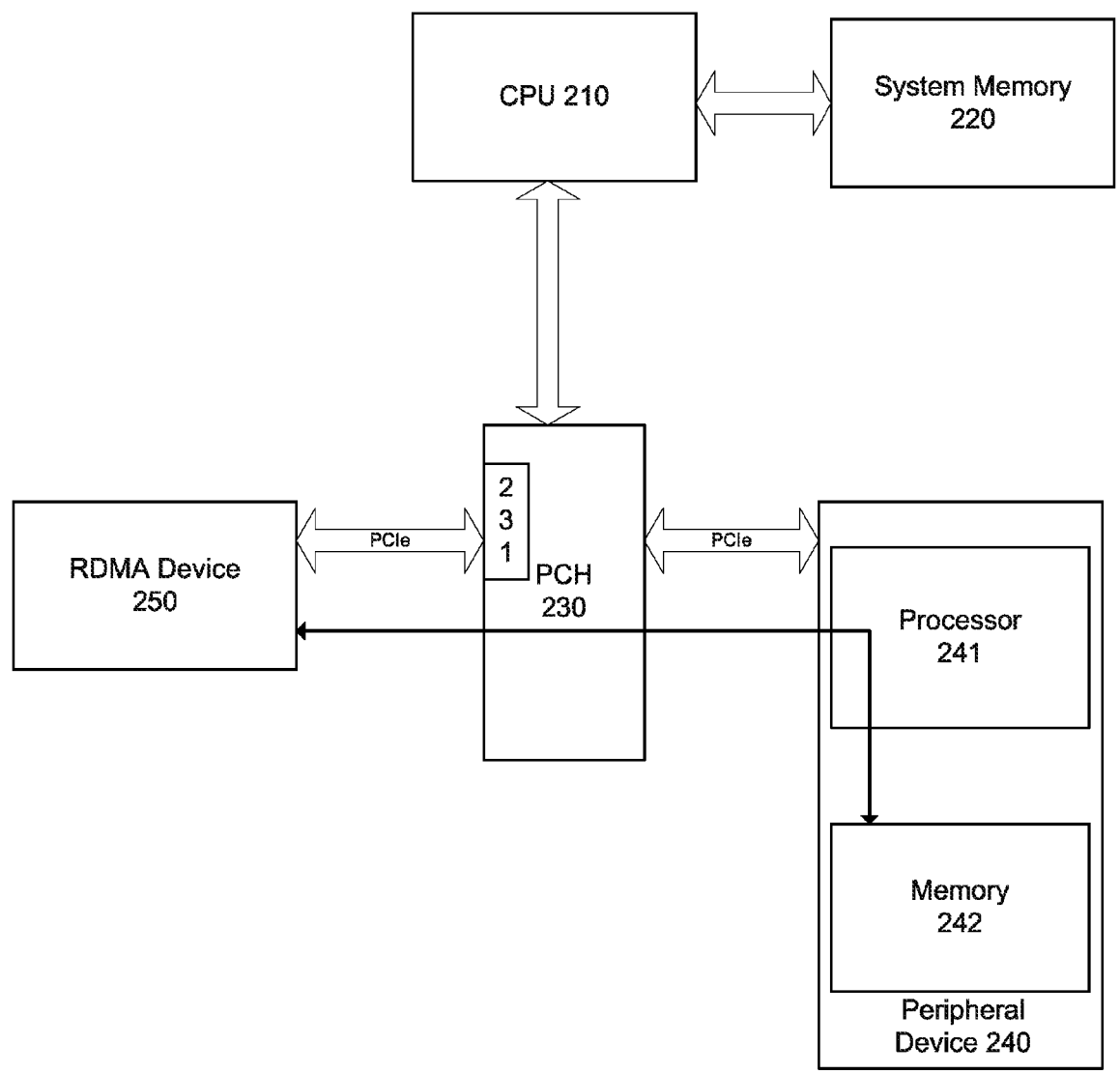
FIG. 2 is a block diagram of a system according to an embodiment of the invention.

FIG. 2 is a block diagram of a system according to an embodiment of the invention. System 200 includes system CPU 210, system memory 220, platform controller hub (PCH) 230, peripheral device 240 and RDMA device 250. In this embodiment, peripheral device 240 is a processor add-in card and includes processor 241 and memory 242. Peripheral device 240 and RDMA device 250 may be referred to as "peer" devices.

Peripheral device 240 may request access data that is stored in RDMA device 250. While said devices are shown to be communicatively coupled to PCH 230 via PCIe links, and RDMA device is shown to be operatively coupled to PCH 230 via PCIe root port 231, in this embodiment peripheral device 240 does not contain a PCH, and thus does not have the capabilities to dedicate a Host Channel Adapter/Network Interface Controller (HCA/NIC) card to RDMA device 250 (it is to be understood, however, that peripheral devices containing a PCH or an internal PCIe bus with an on-board RDMA device may also utilize the embodiments of the invention described below). PCIe interconnects alone do not enable a peer device to access data stored in another peer device's address space.

Embodiments of the invention describe logic and/or modules included in system 200, PCH 230, and peripheral device 240 to allow the peripheral device to have direct access to data included in RDMA device 250—i.e., system memory 220 is not required as it is in prior art solutions such as system 100 of FIG. 1. By eliminating the need for host memory to receive additional copies of the requested data into host memory, embodiments of the invention significantly decrease message latency and increase achievable bandwidth.

Figure 3:
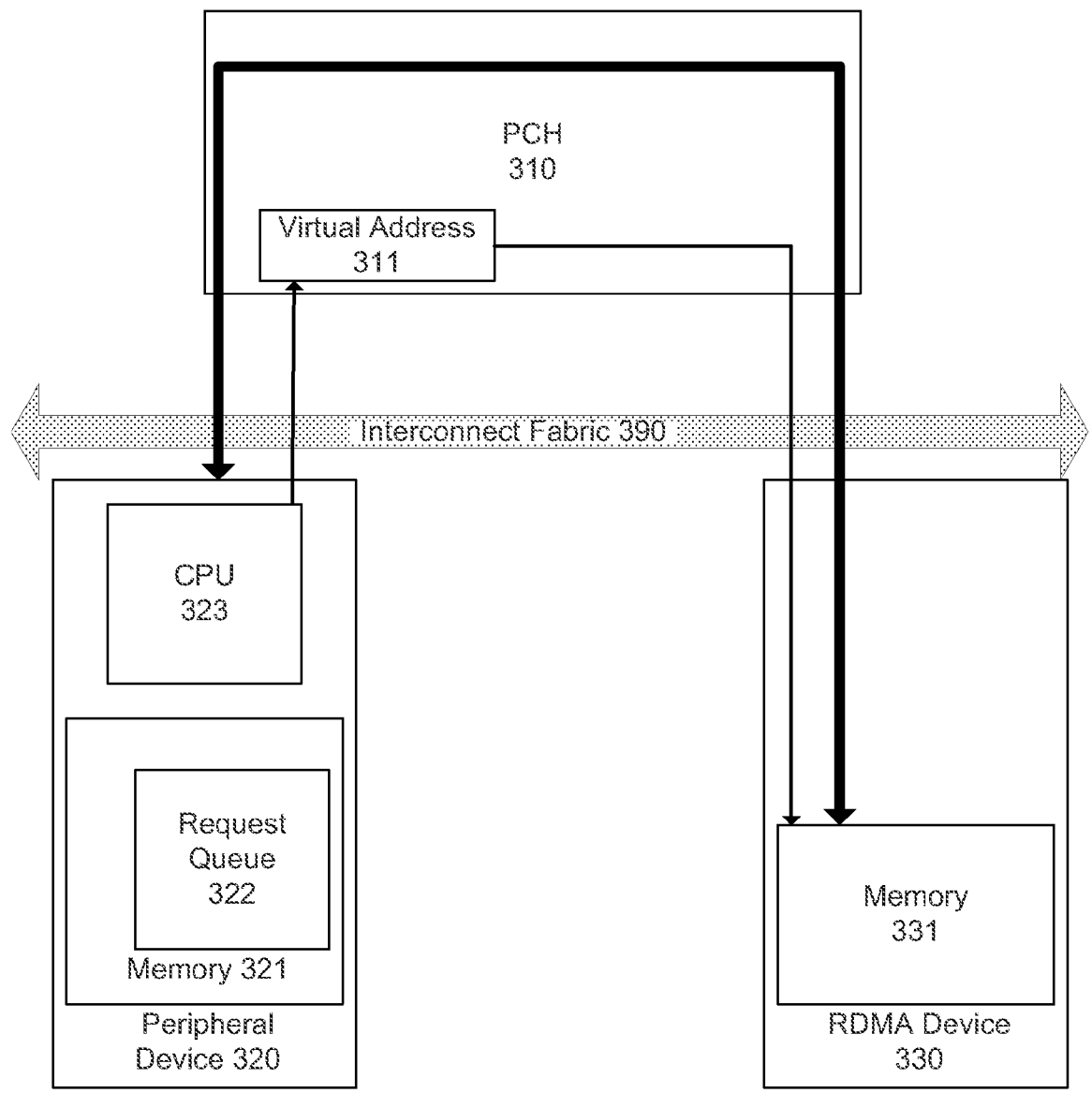
FIG. 3 is a block diagram of system components according to an embodiment of the invention.

FIG. 3 is a block diagram of system components according to an embodiment of the invention. In this embodiment, PCH 310, peripheral device 320 and RDMA device 330 are communicatively coupled to one another via system bus (alternatively referred to herein as intra-node bus) 390. Peripheral device 320 is similar to device 240 of FIG. 2 in that it does not have the capabilities to have RDMA device 330 be dedicated to it.

In this embodiment, memory 321 of peripheral device 320 includes request queue 322, which stores requests directed towards memory 331 of RDMA device 330. CPU 323 of the peripheral device notifies RDMA device 330 that said request queue has outstanding requests for access to memory 331. In one embodiment, RDMA device 330 is notified when any outstanding requests are in queue 322; in other embodiments, RDMA device 330 is notified when the number of outstanding requests in queue 322 exceeds a threshold value.

CPU 323 notifies RDMA device 350 of outstanding requests by writing to virtual address 311 included in PCH 310. Said virtual address is memory mapped to memory 331 of the RDMA device. Said outstanding requests may describe the operation to be performed—e.g., send, receive, write, read, atomic compare/exchange, atomic fetch/add, etc. Thus, embodiments of the invention may be described to "proxy" requests from peripheral device 320 to PCH 310 of the host system.

Figure 4:
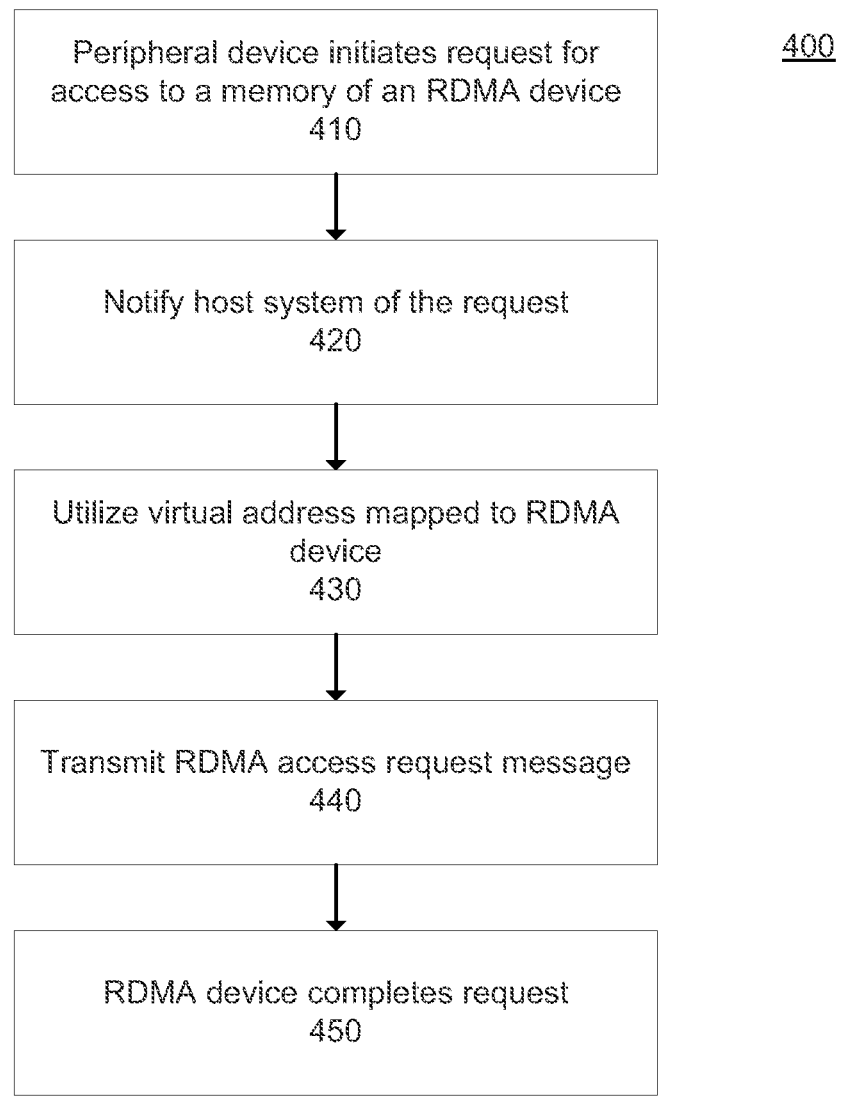
FIG. 4 is a flow diagram of a process according to an embodiment of the invention.

FIG. 4 is a flow diagram of a process according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 400 includes an operation by a peripheral device including a processor core and a memory to receive requests for access to a memory of an RDMA device, 410. Said requests may be stored in a queue in memory of the peripheral device. In some embodiments, said peripheral device includes multiple processor cores, and maintains separate queues for each of the processing cores.

The peripheral device notifies the RDMA device of access requests messages in its queue by sending data to a virtual address included in the PCH, 420. Said virtual address is included in the PCH and mapped to memory of the RDMA device. The PCH utilizes the virtual address mapped to the RDMA device, 430, and transmits an RDMA access request message to the memory of the RDMA device, 440. Said RDMA access request message is based on the access request message queued in the peripheral device.

The RDMA device completes the request from the peripheral device in response to receiving the RDMA access request message, 450. In some embodiments, the RDMA device sends a completion message to a virtual address included in the PCH and mapped to the memory of the peripheral device; said virtual address may represent a completion queue to store said completion messages. For example, if the RDMA access request message comprises an RDMA read request, a data message including data requested by the peripheral device is sent to the peripheral device via the PCH; if the RDMA access request message comprises an RDMA write request, the PCH transmits a data message to the RDMA device including the data to be written. In some embodiments, the completion of an RDMA operation does not determine when a completion message is sent by the RDMA device. For example, the InfiniBand specification requires that requests be initiated in the order in which they are posted, meaning that the peripheral device will not receive the completion message until all prior RDMA operations have completed.

Figure 5:
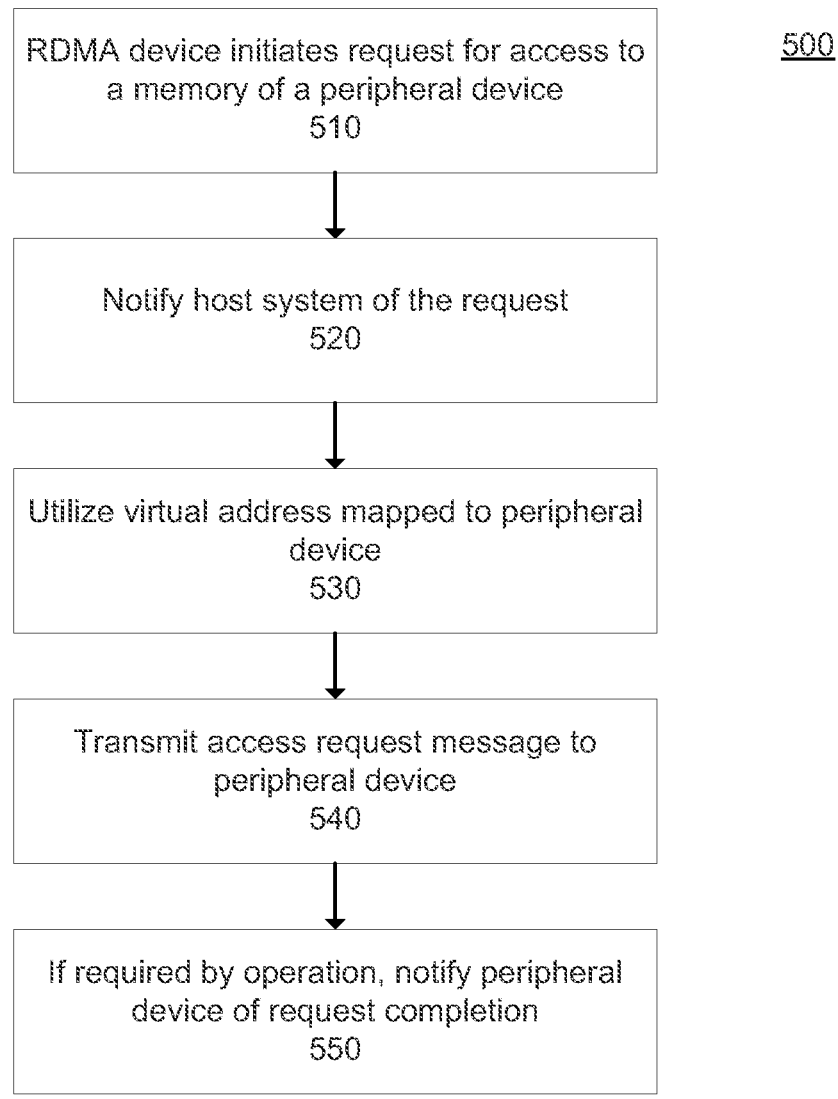
FIG. 5 is a flow diagram of a process according to an embodiment of the invention.

FIG. 5 is a flow diagram of a process according to an embodiment of the invention. Process 500 includes an operation by an RDMA device to receive requests for access to a memory of a peripheral device (which also includes a processor core), 510. Said requests may be stored in a queue in memory of the RDMA device.

The RDMA device notifies a host system of access requests messages in its queue by sending data to a virtual address included in the PCH, 520. Said virtual address is mapped to memory of the peripheral device. The PCH utilizes a virtual address mapped to the RDMA device as an access request message parameter, 530, and transmits an access request message to the memory of the peripheral device, 540. Said access request message transmitted to the peripheral device is based on the access request message queued in the RDMA device.

The peripheral device completes the request from the RDMA device in response to receiving the access request message from the PCH. For example, if the access request message comprises a read request, a data message including data requested by the RDMA device is sent to the RDMA device via the PCH; if the access request message comprises a write request, the RDMA device transmits a data message including the data to be written to the peripheral device via the PCH. The RDMA device may, depending on the type of RDMA operation and/or parameter, send a completion message to a virtual address included in the PCH and mapped to the memory of the peripheral device, 550. Said virtual address may represent a completion queue to store said completion messages.

Figure 6:
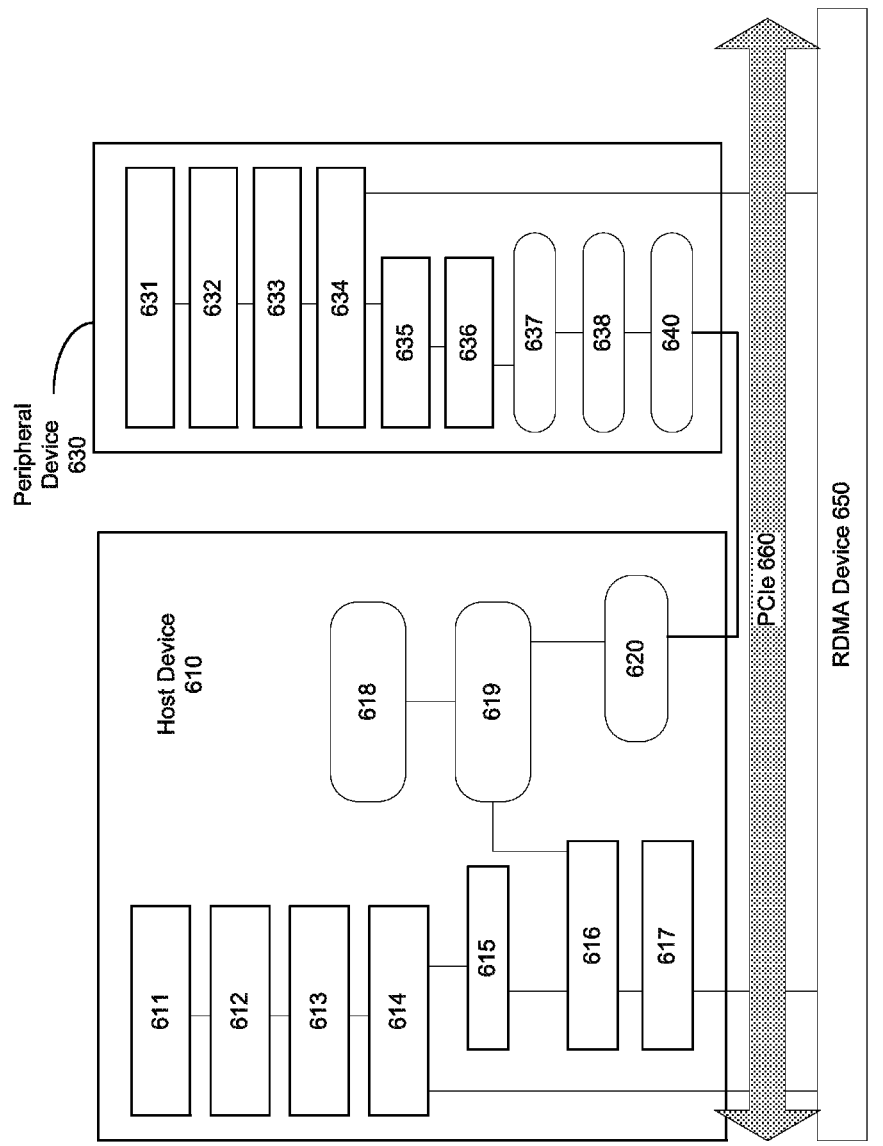
FIG. 6 is a block diagram of host and processor add-in card modules according to an embodiment of the invention.

FIG. 6 is a block diagram of host and processor add-in card modules according to an embodiment of the invention. As described above, embodiments of the invention may utilize interconnects consistent with InfiniBand specifications (for example, specification release 1.0.a, published Jul. 19, 2001) InfiniBand is a switched fabric communications link primarily used in high-performance computing and provides quality of service and failover features as well as scalability. An InfiniBand interconnect generally provides lower latency, higher bandwidth, and improved reliability. InfiniBand provides a way to move information among the components of a computer system and among computers InfiniBand enables computer CPUs to communicate directly with I/O devices and other CPUs with very high performance. InfiniBand technology is targeted for the back end of a data center of any network. The front end and in the middle end of the network infrastructure typical includes legacy Ethernet technology. In other words, InfiniBand and Ethernet technology may both be usable by the same host.

Host 610 and peripheral device card 630 are shown to include various InfiniBand modules (described below), and are communicatively coupled to RDMA device 650 via PCIe interconnect 660. As described below, RDMA messages received by RDMA device 650 may be consistent with an RDMA Consortium specification (e.g., RDMA Protocol Specification (Version 1.0), published Oct. 21, 2002). The RDMA protocol of the RDMA consortium is specified above the TCP layer in the TCP/IP protocol. Thus, RDMA operations travel from the top of the protocol stack to the bottom on the transmitter side, and then up the protocol stack to the top on the receiver side. RDMA protocols utilized by embodiments of the invention may include building rudimentary TCP/IP processing hardware to receive a packet, terminate TCP/IP, process the packet through TCP/IP to the application layer, and extract the data and address at the application layer for writing to memory. The RDMA protocol can prevent the copying of the packet to memory (and then subsequently copying the data payload to memory), making the data transfer more efficient (especially for larger data payloads).

In this embodiment, modules on host 610 and peripheral device 630 communicate with each other and have direct access to RDMA device 650 across PCIe interconnect 660. The modules use a split-driver model to proxy operations across PCIe interconnect 660 to manage RDMA device resources.

Host 610 is shown to include an InfiniBand based software communications stack including Message Passing Interface (MPI) application 611, user-mode Direct Access Provider Library (uDAPL) 612, which is an RDMA API, IB verbs (i.e., functions) library 613, vendor library 614, IB uverbs 615, IB core 616 and vendor driver 617. Peripheral device 630 similarly includes MPI application 631, uDAPL 632, IB verbs library 633, vendor library 634, IB uverbs 635 and IB core 636. Said host and peripheral device further utilize embodiments of the invention implemented as the modules described below.

Host 610 includes IB proxy daemon 618. The IB proxy daemon is a host user-mode application that provides a user-mode process context to IB proxy server 619 (described below) for calls to underlying vendor driver 617. A user-mode process context may be used to perform virtual address mappings of the memory of RDMA device 650 without modifying vendor drivers 617.

Host 610 further includes IB proxy server 619, which comprises a host kernel module. In this embodiment, said IB proxy server provides a communication and command service for IB proxy client 638 of peripheral device 630 (described below). In this embodiment, IB proxy server 619 listens for client connections and relays RDMA device add, remove, and event notification messages. The IB Proxy Server 619 may further initiate kernel-mode IB verbs calls to IB core layer 616 on behalf of IB proxy client 638 and return their results.

Peripheral device 630 includes IB proxy client 638, which comprises a kernel module. Said IB proxy client provides a programming interface to vendor proxy driver 637 (described below) to perform kernel-mode IB verbs calls on host 610. The interface may further abstract the details of formatting commands and performing the communication; IB proxy client 638 invokes callbacks for specific device add, remove, and event notifications to vendor proxy driver 637.

Peripheral device 630 further includes vendor proxy driver 637, which comprises a kernel module. Different vendor proxy drivers may be used to support specific RDMA devices. Each of said vendor proxy drivers may register with IB proxy client 638 for RDMA device add, remove, and event notifications from specific PCIe devices. Vendor proxy driver 637 may use the programming interface provided by IB proxy client 638 to perform kernel-mode IB verbs calls. Said vendor proxy driver further handles the interpretation and transfer of any private data shared between vendor library 634 and vendor driver 617 on host 610.

In this embodiment, both host 610 and peripheral device 630 include Symmetric Communications Interface (SCIF) modules 620 and 640, respectively. Said SCIF modules provide mechanisms for intra-node communication within a single platform. SCIF abstracts the details of communicating over PCIe (and controlling related peripheral device hardware) while providing an API that is symmetric between host 610 and peripheral device 630.

In addition to the modules described above, embodiments of the invention may utilize calls in IB core layer 616 to transfer private data between vendor libraries 614 and 634 and vendor driver 617, as well as for mapping memory to RDMA device 650.

The above described "verbs" (i.e., functions) perform RDMA operations directed towards RDMA device 650. Verbs may be categorized into privileged and non-privileged classes. Privileged verbs are typically used to allocate and manage RDMA hardware resources and are implemented by vendor driver 617. For an application running on peripheral device 630, these privileged verbs may be forwarded to vendor driver 617 on host 610 through vendor proxy driver 637. Once a hardware resource has been allocated and initialized, non-privileged verbs allow direct access to hardware from user-mode, bypassing the kernel, using memory mapped into application address space during resource allocation. Likewise, the RDMA device may access queues and perform data transfers directly to or from process address space. Thus, embodiments of the invention makes a client process on peripheral device 630 appears as if it were another "user-mode" process on host 610.

Thus, the above modules allow host 610 to receive notification of an access request message from a processor core of peripheral device 630 for access to memory of RDMA device 650. Said notification is received at a virtual address included in host 610 and memory mapped to memory of RDMA device 650 (e.g., as shown in FIG. 3). Host device 610 transfers an RDMA access request to the RDMA device based on said access request message, wherein the request includes a virtual address RDMA parameter. Therefore, whatever type of data request said access request message comprises—e.g., send, receive, write, read, atomic compare/exchange, atomic fetch/add, etc., it appears to RDMA device 650 as if it originated from a "user-mode" process on host 610, rather than from peripheral device 630.

Figure 7:
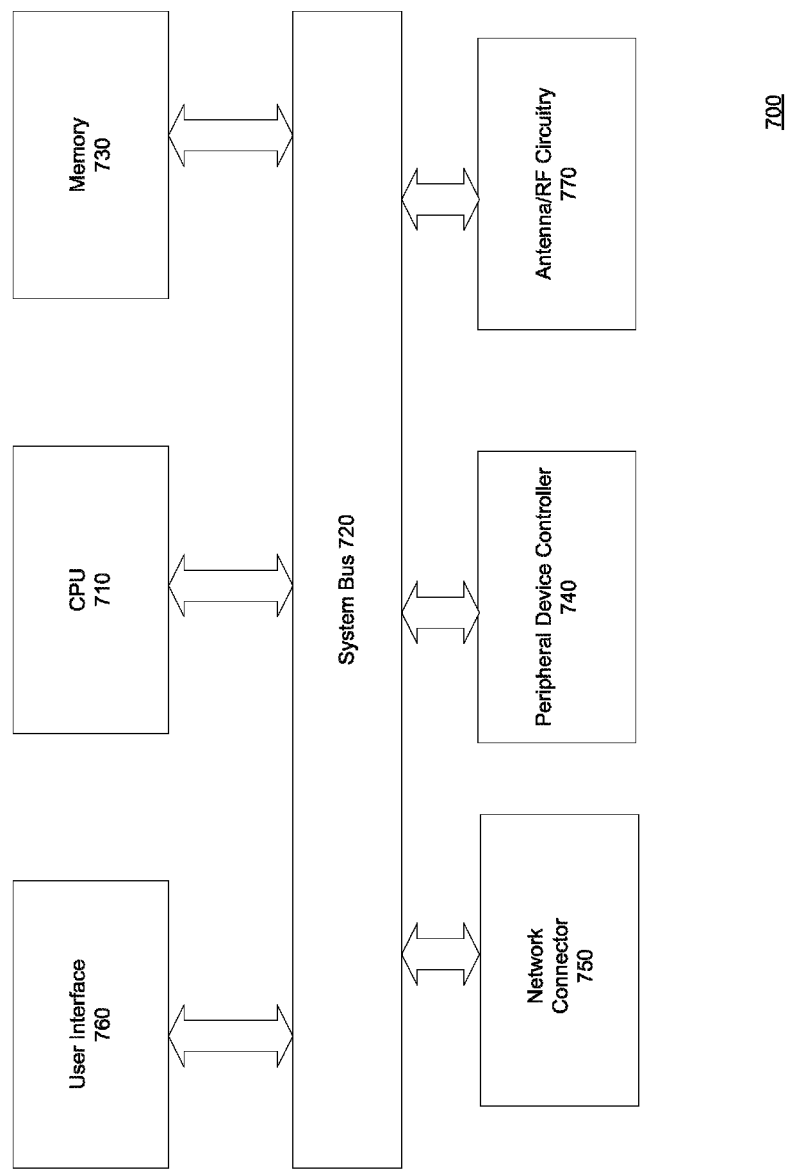
FIG. 7 is block diagram of a system that may utilize an embodiment of the invention.

FIG. 7 is block diagram of a system that may utilize an embodiment of the invention. System 700 may describe a server platform, or may be included in, for example, a desktop computer, a laptop computer, a tablet computer, a netbook, a notebook computer, a personal digital assistant (PDA), a server, a workstation, a cellular telephone, a mobile computing device, an Internet appliance, an MP3 or media player or any other type of computing device.

System 700 may include processor 710 to exchange data, via system bus 720, with user interface 760, system memory 730, peripheral device controller 740 and network connector 750. Said peripheral device controller may be communicatively coupled to a peripheral device and an RDMA device and may manage I/O requests between the devices according to any of the above described embodiments of the invention.

System 700 may further include antenna and RF circuitry 770 to send and receive signals to be processed by the various elements of system 700. The above described antenna may be a directional antenna or an omni-directional antenna. As used herein, the term omni-directional antenna refers to any antenna having a substantially uniform pattern in at least one plane. For example, in some embodiments, said antenna may be an omni-directional antenna such as a dipole antenna, or a quarter wave antenna. Also for example, in some embodiments, said antenna may be a directional antenna such as a parabolic dish antenna, a patch antenna, or a Yagi antenna. In some embodiments, system 700 may include multiple physical antennas.

While shown to be separate from network connector 750, it is to be understood that in other embodiments, antenna and RF circuitry 770 may comprise a wireless interface to operate in accordance with, but not limited to, the IEEE 802.11 standard and its related family, Home Plug AV (HPAV), Ultra Wide Band (UWB), Bluetooth, WiMax, or any other form of wireless communication protocol.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A system comprising:
   a remote direct memory access (RDMA) device;
   a peripheral device including a central processing unit (CPU) and a memory; and
   a platform controller hub (PCH) communicatively coupled to the RDMA device and the peripheral device, the PCH to:
      receive a notification of an access request message at a virtual address included in the PCH and mapped to one of the memory of the peripheral device or a memory of the RDMA device;
      in response to receiving the access request message at a virtual address mapped to the memory of the RDMA device, transmit an RDMA access request to the RDMA device based on the access request message for the memory of the RDMA device from the peripheral device, the RDMA access request message to include a virtual address RDMA parameter; and
      in response to receiving the access request message at a virtual address mapped to the memory of the peripheral device, transmit an access request message to the memory of the peripheral device.

2. The system of claim 1, wherein the RDMA access request comprises an RDMA read request and the PCH to further:
   receive the data requested by the peripheral device from the RDMA device; and
   transmit a data message including the data to the memory of the peripheral device.

3. The system of claim 1, wherein the RDMA access request comprises an RDMA write request, and the PCH to further:

receive the data requested by the RDMA device from the memory of the peripheral device; and transmit a data message including the data to the RDMA device.

4. The system of claim 1, wherein the CPU of the peripheral device comprises one of a plurality of processing cores or multi-core processors included in the peripheral device.

5. The system of claim 1, wherein the peripheral device and the RDMA device are each communicatively coupled to the PCH via a Peripheral Component Interconnect express (PCIe) link.

6. The system of claim 5, wherein the RDMA device and the PCH are communicatively coupled via a PCIe root port.

7. The system of claim 1, wherein the peripheral device comprises a graphics subsystem, and the CPU comprises a graphics processing unit (GPU).

8. The system of claim 1, wherein the access request message is consistent with an InfiniBand specification.

9. The system of claim 1, wherein the access request message is consistent with an RDMA Consortium specification.

10. A method comprising:

receiving a notification of an access request message at a virtual address mapped to one of a memory of a remote direct access (RDMA) device and a memory of a peripheral device further including a central processing unit (CPU);

in response to receiving the access request message at a virtual address mapped to the memory of the RDMA device:

utilizing the virtual address mapped to the memory of the RDMA device as an RDMA parameter; and transmitting an RDMA access request to the RDMA device based on the access request message for the memory of the RDMA device from the peripheral device and including a virtual address RDMA parameter; and in response to receiving the access request message at a virtual address mapped to the memory of the peripheral device, transmitting an access request message to the memory of the peripheral device.

11. The method of claim 10, wherein the RDMA access request comprises an RDMA read request and the method further comprises:

receiving the data requested by the peripheral device from the RDMA device; and transmitting a data message including the data to the memory of the peripheral device.

12. The method of claim 10, wherein the RDMA access request comprises an RDMA write request, and the method further comprises:

receiving the data requested by the RDMA device from the memory of the peripheral device; and transmitting a data message including the data to the RDMA device.

13. The method of claim 10, wherein the CPU of the peripheral device comprises one of a plurality of processing cores or multi-core processors included in the peripheral device.

14. The method of claim 10, wherein the peripheral device and the RDMA device are each communicatively coupled to the PCH via a Peripheral Component Interconnect express (PCIe) link.

15. The method of claim 14, wherein the RDMA device and the PCH are communicatively coupled via a PCIe root port.

16. The method of claim 10, wherein the peripheral device comprises a graphics subsystem, and the CPU comprises a graphics processing unit (GPU).

17. The method of claim 10, wherein the access request message is consistent with at least one of an InfiniBand specification and an RDMA Consortium specification.

18. An apparatus comprising:

a first interconnect link communicatively coupled to a remote direct memory access (RDMA) device;

a second interconnect link communicatively coupled to a peripheral device including a central processing unit (CPU) and a memory; and a platform controller hub (PCH) to:

receive a notification of an access request message at a virtual address included in the PCH and mapped to one of the memory of the peripheral device or a memory of the RDMA device;

in response to receiving the access request message at a virtual address mapped to a memory of the RDMA device, transmit an RDMA access request to the RDMA device based on the access request message for the memory of the RDMA device from the peripheral device, the RDMA access request message to include a virtual address RDMA parameter; and in response to receiving the access request message at a virtual address mapped to the memory of the RDMA device, transmit an access request message to the memory of the peripheral device.

19. The apparatus of claim 18, wherein the RDMA access request comprises an RDMA read request and the PCH to further:

receive the data requested by the peripheral device from the RDMA device; and transmit a data message including the data to the memory of the peripheral device.

20. The apparatus of claim 18, wherein the RDMA access request comprises an RDMA write request, and the PCH to further:

receive the data requested by the RDMA device from the memory of the peripheral device; and transmit a data message including the data to the RDMA device.

21. The apparatus of claim 18, wherein first and second interconnect links each comprise a Peripheral Component Interconnect express (PCIe) link, and the apparatus further comprises a root port communicatively coupled to the RDMA device.

* * * * *